(12) United States Patent
Kokubo

(10) Patent No.: US 7,760,995 B2
(45) Date of Patent: Jul. 20, 2010

(54) WINDOW DISPLAY SYSTEM AND WINDOW DISPLAY METHOD

(75) Inventor: Hideyuki Kokubo, Saitama (JP)

(73) Assignee: Fujifilm Corporation, Tokyo (JP)

( * ) Notice: Subject to any disclaimer, the term of this patent is extended or adjusted under 35 U.S.C. 154(b) by 767 days.

(21) Appl. No.: 11/703,682

(22) Filed: Feb. 8, 2007

(65) Prior Publication Data

US 2007/0192722 A1 Aug. 16, 2007

(30) Foreign Application Priority Data

Feb. 10, 2006 (JP) ............................. 2006-034203

(51) Int. Cl.
*G03B 17/00* (2006.01)
*G06F 3/048* (2006.01)

(52) U.S. Cl. ......................... 396/51; 396/287; 715/799

(58) Field of Classification Search .................. 396/51, 396/287; 715/790, 799
See application file for complete search history.

(56) References Cited

U.S. PATENT DOCUMENTS 4,409,479 A * 10/1983 Sprague et al. ......... 250/237 G
6,603,485 B2 * 8/2003 Forman ...................... 345/626
2005/0125742 A1 * 6/2005 Grotjohn et al. ............ 715/799
2009/0295738 A1 * 12/2009 Chiang ....................... 345/173

FOREIGN PATENT DOCUMENTS

| JP | 2000-314636 A | 11/2000 |
| JP | 2001-306209 A | 11/2001 |
| JP | 2003-263256 A | 9/2003 |

* cited by examiner

Primary Examiner—W. B. Perkey
(74) Attorney, Agent, or Firm—Birch, Stewart, Kolasch & Birch, LLP

(57) ABSTRACT

When a choice is made between several items offered in a first window on a display screen, a second window is displayed in front of the first window. An image of an watcher who is watching the display screen is captured to detect watcher's eye position relative to the display screen. When the watcher's eye position moves, the second window is displaced to uncover the first window in such a way that the second window moves upward in response to a downward movement of the eye position, downward in response to an upward movement of the eye position, rightward in response to a leftward movement of the eye position or leftward in response to a rightward movement of the eye position.

6 Claims, 13 Drawing Sheets

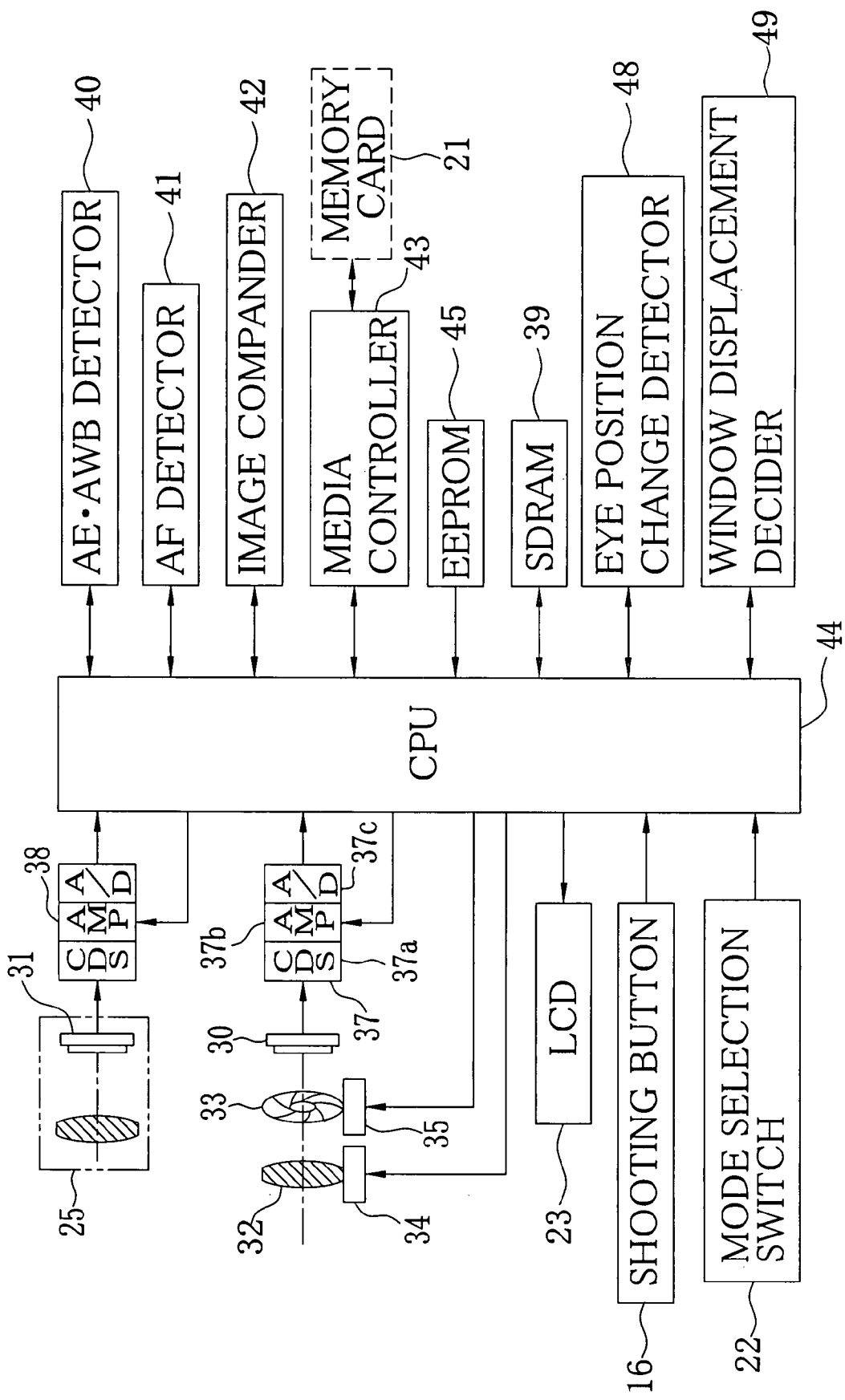

X-AXIS CW DIRECTION

Y-AXIS CCW DIRECTION

WINDOW DISPLAY SYSTEM AND WINDOW DISPLAY METHOD

FIELD OF THE INVENTION

The present invention relates to a window display system and a window display method that displays a plurality of windows in predetermined zones on a screen, to offer a choice of several items and then display information on the chosen item in the respective windows.

BACKGROUND OF THE INVENTION

As a communication terminal provided with a small liquid crystal display device, cellular phones and car navigation terminals have been known. For example, in the car navigation terminal, the user designates a goal point by entering information on the goal point on a menu screen, in order to search for a root to the goal point. When the user chooses a goal-setting menu, the menu screen displays several entry items for designating the goal point, e.g. telephone number, address, registered points, and so forth. When the user chooses a search based on the address, candidates for a local area, a city or town, and address numbers are displayed hierarchically, so that the user may choose these items sequentially, as disclosed for example in Japanese Laid-open Patent Application No. 2000-314636. The candidate items of the same class or hierarchical grade are usually displayed in the same window, and a subordinate window is displayed in front of an upper class or main window.

Once the subordinate window is displayed, the upper class window is hidden behind the subordinate window. Therefore, it sometimes happens that the user cannot instantly recognize the fact that the choice made in the upper class window is wrong. To solve this problem, Japanese Laid-open Patent Application No. 2003-263256 suggests a multi-window display system, which displays windows while shifting their positions from each other, so that the items offered in a main window are partly displayed even after a subordinate window is displayed in response to a choice from the items in the upper class window. Also a window display system displaying an upper class window in an enlarged size to display a subordinate window inside the upper class window has been known from Japanese Laid-open Patent Application No. 2001-306209.

However, the window display systems disclosed in the second and third mentioned prior arts need a large screen for displaying a plurality of windows. In order to apply these systems to a display device with a small screen, it is necessary to reduce the font size and the like to reduce the respective sizes of the windows, which worsens the user-friendliness of the display screen.

SUMMARY OF THE INVENTION

In view of the foregoing, a primary object of the present invention is to provide a window display system and a window display method that enables the user to recognize with ease which item is chosen on another window hidden behind a front window, even while it is applied to a display device with a small screen.

According to the present invention, a window display system for displaying at least a main window and a sub window on a display screen, wherein the main window offers a choice of several items, and the sub window is displayed in front of the main window when the choice is made in the main window, to show information on the chosen item, comprises:

an imaging device for capturing an image of a watcher who is watching the display screen;

a position detecting device for detecting a watching position of the watcher to the display screen by analyzing the image of the watcher;

a position change detecting device for detecting a direction and a distance of a parallel movement of the watching position relative to the display screen; and a window displacing device for displacing the sub window from the front of the main window based on the movement of the watching position as detected by the position change detection device.

The window displacing device preferably moves the sub window in an opposite direction to the direction of the movement of the watching position detected by the position change detection device.

The position detecting device preferably detects eyes of the watcher from the image, to determine an eye position of the detected eyes within an image frame to be corresponding to the watching position.

According to a preferred embodiment, the window display system further comprises a distance detecting device for detecting a distance of the watcher from the display screen based on the size of the eyes in the image, the distance between the eyes in the image, or both, wherein if eyes of more than one person are detected from the image, the position detecting device determines the watching position by the eyes of the nearest person to the display screen.

Preferably, the window display system further comprises a distance detecting device for detecting a distance of the watcher from the display screen, and a judging device for judging whether the parallel movement of the watching position reaches a reference value that is decided by the distance of the watcher from the display screen, wherein the window displacing device displaces the sub window when it is judged that the parallel movement of the watching position reaches the reference value.

The present invention further provides a window display system for displaying at least a main window and a sub window on a display screen, wherein the main window offers a choice of several items, and the sub window is displayed in front of the main window when the choice is made in the main window, to show information on the chosen item, wherein the window display system comprises:

a position change detection device for detecting a change in position of the display screen; and a window displacing device for displacing the sub window from the front of the main window based on the detected change in position of the display screen.

The position change detection device preferably comprises a tilt detector for detecting a tilt of the display screen. The tilt detector may be a gyro magnetic sensor that detects a direction and an angular velocity of a rotational movement of the display screen. The tilt detector may be a gravity sensor that detects a tilt of the display screen with respect to plumb-vertical direction.

The present invention also provides a window display system for displaying at least a main window and a sub window on a display screen, wherein the main window offers a choice of several items, and the sub window is displayed in front of the main window when the choice is made in the main window, to show information on the chosen item, wherein the window display system comprises:

an input device for inputting a direction to displace the sub window; and a window displacing device for displacing the sub window from the front of the main window in the input direction.

According to the present invention, a window display method comprises the steps of:

capturing an image of a watcher who is watching said display screen;

detecting a watching position of the watcher to said display screen by analyzing the image of the watcher;

detecting a direction and a distance of a parallel movement of said watching position relative to said display screen; and displacing said sub window from the front of said main window based on the movement of said watching position as detected by said position change detection device.

In a preferred embodiment, the window display method comprises the steps of:

detecting a change in position of said display screen; and displacing said sub window from the front of said main window based on the detected change in position of said display screen.

In another preferred embodiment, the window display method comprises the steps of:

inputting a direction to displace the sub window;

displacing said sub window in said input direction from the front of said main window.

According to the present invention, even while a plurality of windows are displayed atop another on the display screen, the topmost window is displaced to uncover the hidden window in response to a motion of the watcher's head, a change in the position of the display screen or an operational signal input by the watcher Therefore, it is easy to review the information contained in the underlying or hidden window. This configuration makes it possible to display the respective windows in a maximum size on the display screen, and thus use a large font size relative to the screen size. Therefore, even with a small size screen, it becomes easy for the user to recognize which item is chosen on the underlying window, and read the information on the chosen item as displayed in the overlying window.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 4 is a block diagram of the digital camera;

DESCRIPTION OF THE PREFERRED EMBODIMENTS

Figure 1:
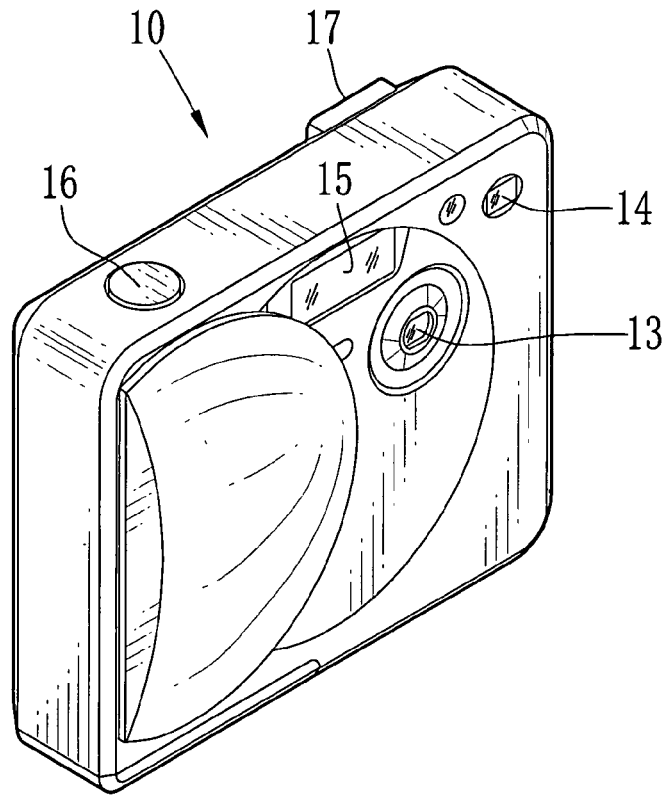
FIG. 1 is a front perspective view of a digital camera according to a first embodiment of the present invention.

A digital camera 10 shown in FIG. 1, to which the present invention is applied records a captured image of subjects as image data. The front of the digital camera 10 is provided with a taking lens 13 for producing an image of the subjects, an optical viewfinder 14 for confirming an image capturing field and a flash projector 15 for projecting a flash to illuminate the subjects. The top of the digital camera 10 is provided with a shooting button 16 that is operated with a press when capturing the subject image.

Figure 2:
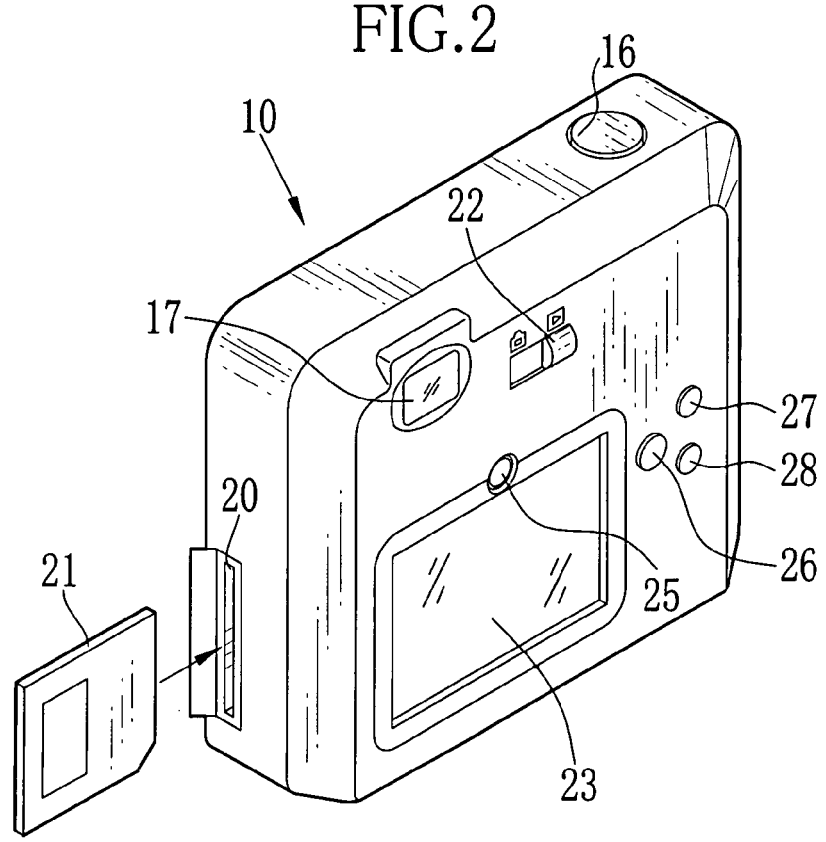
FIG. 2 is a rear perspective view of the digital camera.

As shown in FIG. 2, a side of the digital camera 10 is provided with a memory-card slot 20 into which a memory card 21 for storing the image data is loaded. The memory card 21 is a removable memory medium and is replaceable by a new memory card when a memory capacity of the current card is run out. Moreover the back of the digital camera 10 is provided with a mode selection switch 22 for selecting a shooting mode or a reproducing mode and with an LCD 23 for displaying the captured image.

On the upper side of the LCD 23, there is a rear camera 25 for shooting an image of a camera operator who watches the LCD 23. The image gained from the rear camera 25 is used for specifying the location of the camera operator. The image from the rear camera 25 is neither recorded in the memory card 21 nor displayed on the LCD 23. On the right side of the LCD 23, a menu button 26, an upward button 27 and a downward button 28 are arranged. The menu button 26 is operated when calling up a setting menu for setting a shooting mode, an image quality in storing the images, or the like. The upward button 27 and the downward button 28 are operated for moving a cursor upward or downward in selecting an appropriate item among ones displayed in the setting menu. In order to specify the selected item, the menu button 26 is operated.

Figure 3:
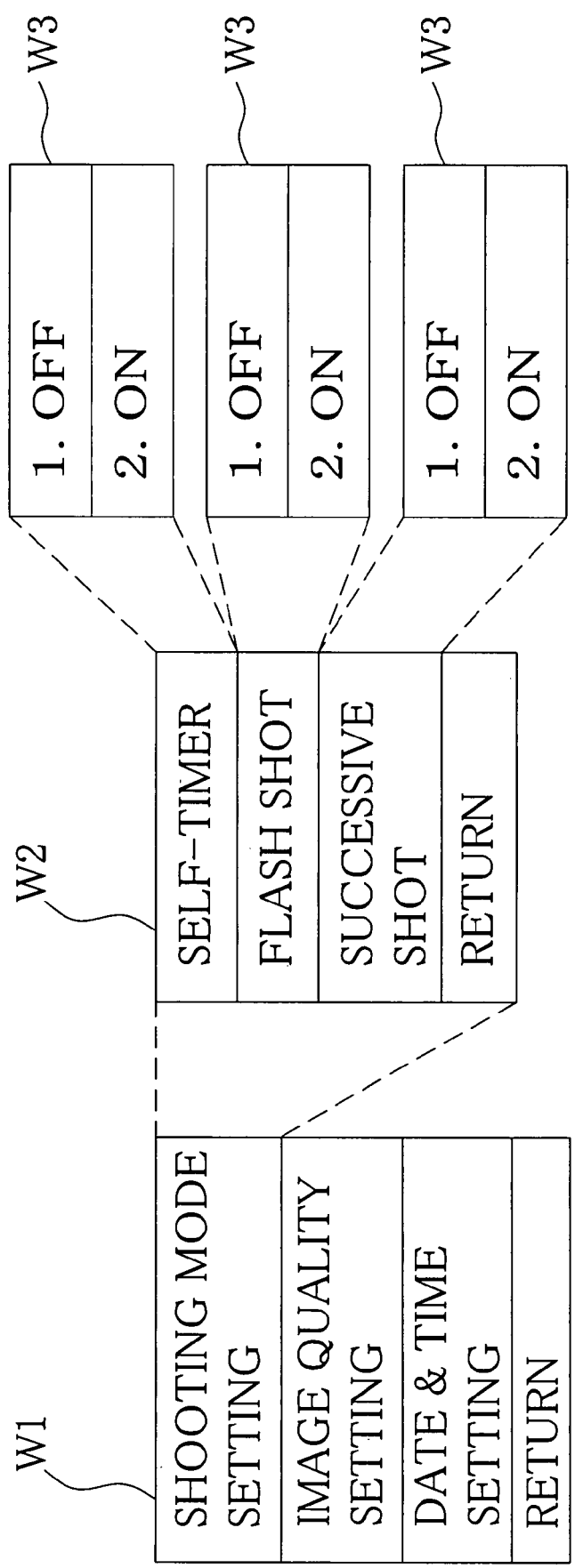
FIG. 3 is a schematic diagram illustrating a structure of a setting menu.

As shown in FIG. 3, the setting menu displayed on the LCD 23 when the menu button 26 is pressed down appears in a first window W1 where selection items of shooting mode setting, image quality setting and date & time setting and an item of "RETURN" for finishing the setting menu line up. When a certain item is selected among the selection items in the first window W1, a second window W2 that belongs to the selected item comes to the screen. For example, when the shooting mode setting is selected in the first window W1, the displayed second window W2 shows the selection items of self-timer, flash shot and successive shot and the item of "RETURN" for stopping the selection in line. The second window W2 is displayed over the first window W1. When a certain item is selected among the selection items of the second window W2: self-timer, flash shot and successive shot, a third window W3 appears where items for selecting "ON" or "OFF" of the selected function are lined. The first window W1 is a main window to the second window W2 and the second window W2 is a sub window to the first window W1. In the same way, between the second window W2 and the third window W3, the second window W2 is a main window to the third window W3, whereas the third window W3 is a sub window to the second window W2.

As shown in FIG. 4, the digital camera 10 is provided with a main image sensor 30 that outputs the subject image produced by the taking lens 13 as an image signal and a sub image sensor 31 that constitutes the rear camera 25. The taking lens 13 consists of a number of lens elements including a focus lens 32 for bringing the subject into focus on an image plane of the main image sensor 30. A variable stop 33 changes an aperture size to adjust the amount of light which passes through the taking lens 13 into the main image sensor 30. The rear camera 25 is made to be a fixed-focus camera which doesn't need aperture control and focus control. The focus lens 32 moves in a direction of an optical axis of the taking lens 13 by the drive of a focus motor 34. The variable stop 33 changes the aperture size by the drive of an iris motor 35.

An image signal output circuit 37 is provided with a correlated double sampling circuit (CDS) 37a for reducing noise of the image signal from the main image sensor 30, an amplifier (AMP) 37b for amplifying the image signal and an A/D converter 37c for converting the analog image signal into digital image data. An image signal output circuit 38 which receives the image signal from the sub image sensor 31 has the same constitution. The image signals outputted from the image signal output circuits 37 and 38 respectively are temporarily stored in a SDRAM 39 as the image data.

An AE/AWB detector 40 detects lightness of image and a bias of color based on the image data taken through the main image sensor 30. The lightness of image is controlled by changing the aperture size of the variable stop 33 and a gain of the AMP 37b. The bias of color is controlled by changing the gain of the image data in the AMP 37b by each individual color components of RGB: red, green and blue.

An AF detector 41 analyzes the image data obtained through the main image sensor 30 to decide a moving direction of the focus lens 32 from a contrast value of the image. The contrast value gets higher as the focus lens 32 moves closer to a focal position. The position where the contrast value reaches its peak is the focal position where the sharpest image is formed.

An image compander 42 executes lossy compression such as JPEG compression to the image data for reducing its data size when storing the image data in the memory card 21 and expands the compressed image data when displaying the image data stored in the memory card 21 as a reproduced image.

A media controller 43 controls a writing process of writing the image data in the memory card 21 and a reading process of reading the image data from the memory card 21. A CPU 44 executes a control program stored in an EEPROM 45 using the SDRAM 39 as a work memory to control operation of respective components of the digital camera 10 according to input operations by a user. In the control program, control procedures of a number of kinds of shooting modes and reproducing modes are predetermined. The CPU 44 displays the above-mentioned setting menu on the LCD 23 and executes a sequence which reflects what the user inputs in the setting menu.

An eye position change detector 48 analyzes the image data of a watcher who watches the LCD 23, which is obtained through the sub image sensor 31, to calculate an eye position of the watcher. The eye position change detector 48 constantly calculates the eye positions of the watcher from a plurality of images outputted successively at a given frame rate from the sub image sensor 31, to detect displacement of the eye position of the watcher.

Figure 5A:
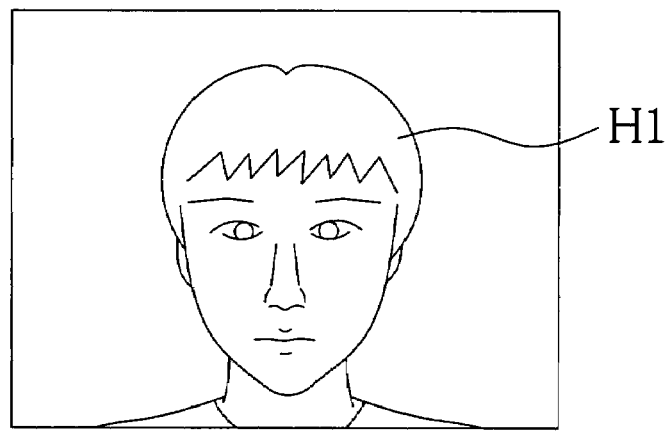
FIGS. 5A, 5B and 5C are explanatory diagrams illustrating a sequence of detecting a change in watcher's eye position relative to a display screen of the digital camera.
Figure 5B:
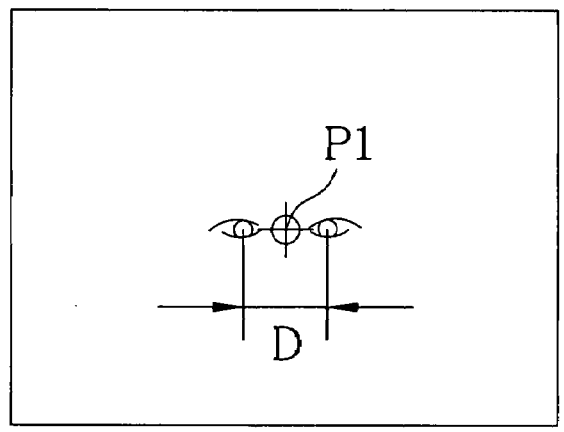

In FIG. 5A, the rear camera 25 shoots a person H1 behind the digital camera 10 by the sub image sensor 31 to get their image. The figure H1 is a camera operator and a watcher of the LCD 23 as well. As shown in FIG. 5B, the eye position change detector 48 specifies a flesh-color face area from the captured image and then both eyes of the person from pixels inside the face area. Moreover, the eye position change detector 48 calculates coordinate values of the middle point of a line segment P1 between centers of the detected eyes as eye position coordinate values. An iris diameter, i.e. a diameter of a dark portion of the eye, and an eye distance D between the centers of the eyes are also calculated. In this case, a center point P0 of an image frame defined by the sub image sensor 31 is regarded as the center of coordinate system, that corresponds to the center of a screen of the LCD 23.

Figure 5C:
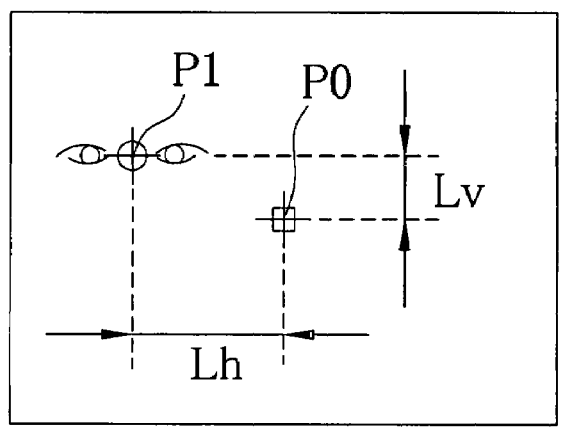

In FIG. 5C, the eye position change detector 48 calculates a distance between the center point P0 and the eye position coordinate point P1. The distance between the center point P0 and the eye position coordinate point P1 is sought in horizontal and vertical directions respectively as for a horizontal distance Lh and a vertical distance Lv. When eyes of a number of persons are detected, the eye position change detector 48 decides those having the greatest iris diameter and the longest eye distance D to be the watcher of the screen and calculates the coordinate values of the middle point of the eyes P1, the horizontal distance Lh and the vertical distance Lv for the eyes of the decided watcher.

A window displacement decider 49 shown in FIG. 4 decides whether the display position of the second window W2 or the third window W3 of the setting menu should be changed or not, based on the magnification of a change in position of the watcher. The window displacement decider 49 compares the horizontal distance Lh and the vertical distance Lv calculated in the eye position change detector 48 with given reference values to judge whether the horizontal distance Lh or the vertical distance Lv reaches the given reference value or not. The window displacement decider 49 changes the reference values to be used for the comparison and judgment according to the eye distance D. For example, three reference values are prepared in advance for a longer distance range, a middle distance range and a short distance range of the eye distance D.

Figure 6A:
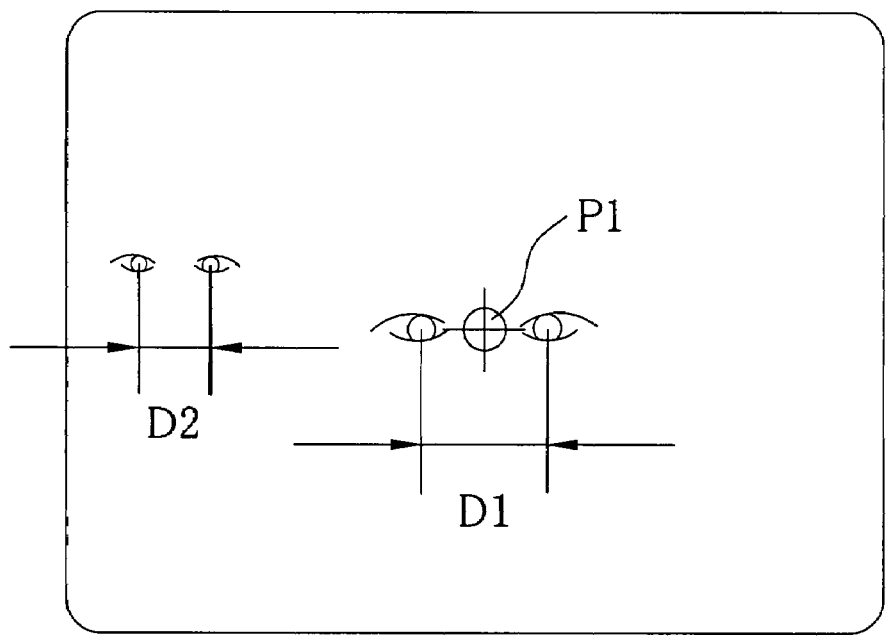
FIGS. 6A and 6B are explanatory diagrams illustrating a relationship between the distance of the watcher's eye position from the display screen and the distance between watcher's eyes as detected by a rear camera.
Figure 6B:
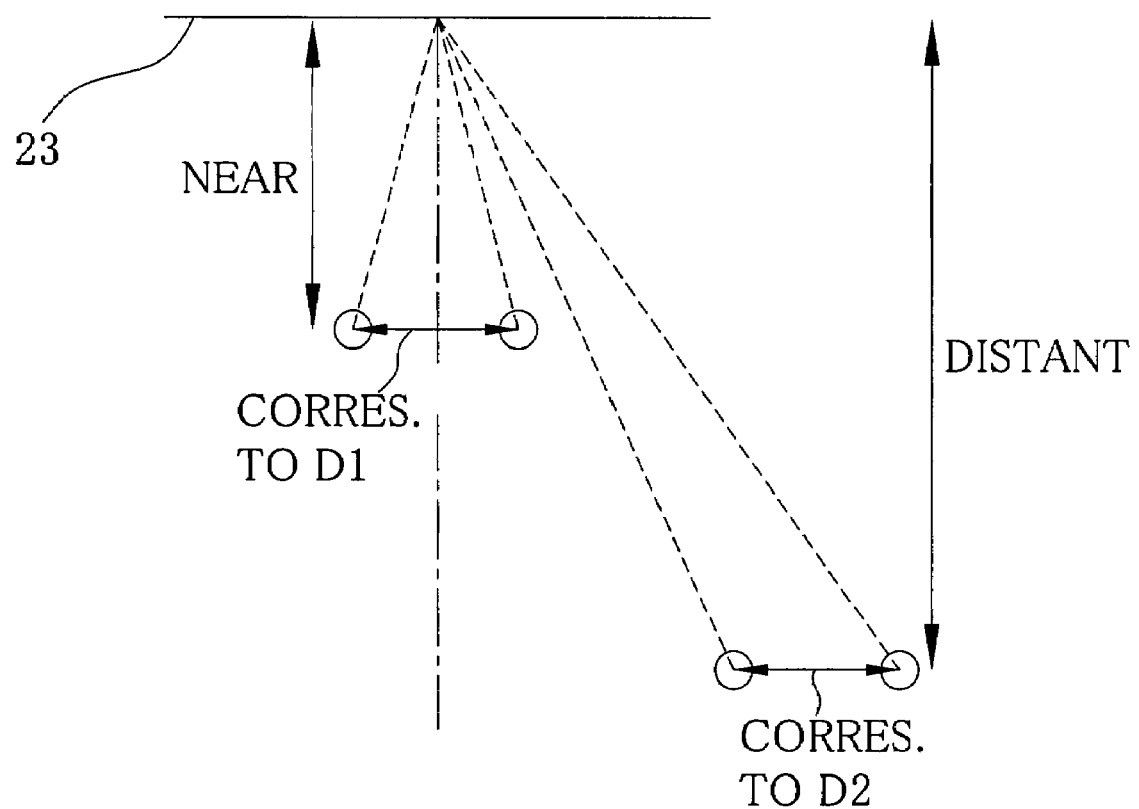

As shown in FIGS. 6A and 6B, when the person H1 is closer to the screen of the LCD 23, the eye distance D gets a longer value D1. A shorter distance D2 between the eyes means that the person H1 is distant from the LCD screen. When the eye distance D is longer, that is, the watcher is near the screen, a smaller reference value is used for the judgment. When the eye distance D is shorter, that is, the watcher is distant from the screen, a larger reference value is used for the judgment. In other words, the closer the watcher is to the screen, the easier for the horizontal distance Lh and the vertical distance Lv to exceed the reference values even if the change in eye position is small.

The window displacement decider 49 decides the direction of displacing the second window W2 or the third window W3 when the change in eye position reaches the reference values. The second window W2 or the third window W3 moves in the opposite direction to one in which the watcher changes the watching position relative to the LCD 23. For example, as the watcher shifts the eye position left, the second window W2 or the third window W3 moves right. As the watcher shifts the watching position to the LCD downward, the second or the third window W2 or W3 moves upward. How far the second window W2 or the third window W3 can move is predetermined to according to the kind or the moving direction of the sub windows.

Figure 7:
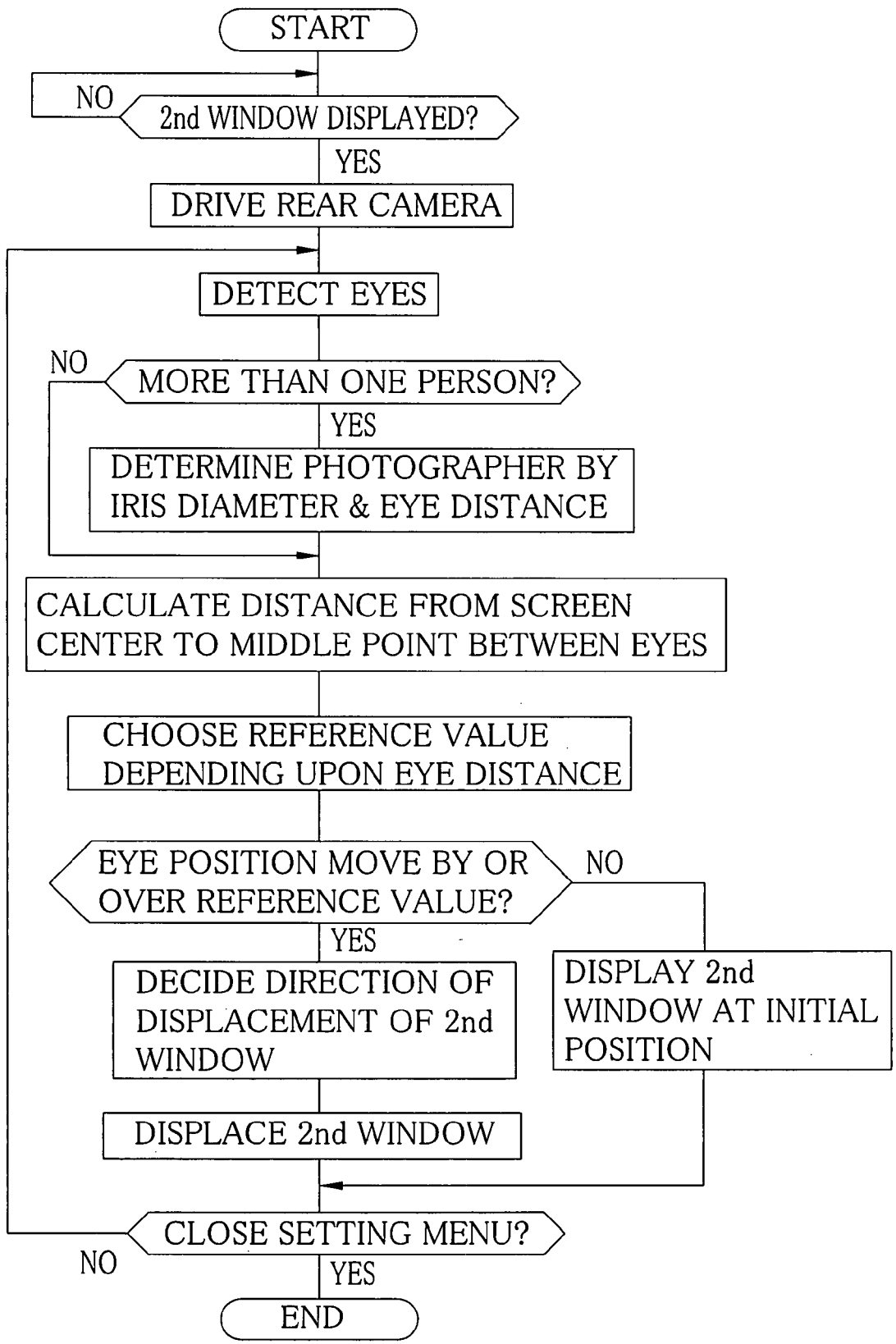
FIG. 7 is a flow chart illustrating a sequence of processes for displaying the setting menu.

Next, the operation of the present invention will be explained while referring to FIG. 7. When using the digital camera 10, the mode selection switch 22 is operated according to whether shooting or reproducing the images. When the shooting mode is selected, the CPU 44 executes a program of the shooting mode. In the shooting mode, the main image sensor 30 is activated to produce the image signal. The image taken through the main image sensor 30 is displayed on the LCD 23 one after another. The image signal, which is obtained through the main image sensor 30 when the shooting button 16 is operated, is stored in the memory card 21 as the image data of a still image. When the reproducing mode is selected, the CPU 44 executes a program of the reproducing mode. In the reproducing mode, the image data stored in the memory card 21 is read out and the captured image is displayed on the LCD 23.

When the menu button 26 is operated in the shooting mode, the setting menu is read out, which cuts off the display of the subject images on the LCD 23. On the screen appears the first window W1 that has four items in line; the shooting mode setting, the image quality setting, the date & time setting and the return. When one item is selected among the shooting mode setting, the image quality setting and the date & time setting by use of the upward button 27 and the downward button 28, the second window W2 that corresponds to each individual item is displayed over the first window W1. For example, when the shooting mode setting is chosen in the first window W1, the second window W2 having four items of the self-timer, the flash shot, the successive shot and the return is displayed.

The CPU 44 activates the sub image sensor 31 when displaying the second window W2. The rear camera 25 provided with the sub image sensor 31 shoots the person H1 who checks information displayed on the LCD 23. The CPU 44 inputs the image of the person H1 to the eye position change detector 48.

The eye position change detector 48 extracts the image of human eyes from the inputted image and calculates the coordinate values of the middle point of the eyes P1, the iris diameter and the eye distance D. When there are eyes of a number of persons in the inputted image, the eye position change detector 48 calculates the distance D between the eyes of each individual person after identifying those having the same iris diameter as the same person. When a number of persons are captured, eyes with the greatest iris diameter and the longest eye distance D are supposed to belong to an operator of the digital camera 10. The eye position change detector 48 calculates the distance between the eye position coordinate point P1 and the center point P0 as the horizontal distance Lh and the vertical distance Lv respectively.

The window displacement decider 49 judges the distance between the camera operator and the LCD 23 from the size of eye distance D to decide the reference values for comparing and judging the size of the horizontal distance Lh and the vertical distance Lv. For example, when the eye distance D is longer than 200 pixels, the camera operator exists in the short distance range. When the eye distance D is shorter than 100 pixels, the camera operator exists in the long distance range. When the eye distance D is between 100 and 200 pixels, the camera operator exists in the middle distance range. As the distance between the person and the screen is divided into three ranges in this way, one is selected among three types of reference values prepared according to the three distance ranges.

The window displacement decider 49 judges whether the horizontal distance Lh and the vertical distance Lv exceed the respective reference values or not, regarding these distances Lh and Lv as the distance of the eye position coordinate point P1 from the center point P0. When either the horizontal distance Lh or the vertical distance Lv is judged to exceed the reference value, the CPU 44 decides the moving direction of the second window W2 based on the direction in which the eye position coordinate point P1 displaces from the center point P0.

The eye position changes when the camera operator moves the digital camera 10 right, left, up or down, or when the camera operator tilts the digital camera 10. Because the camera operator faces the rear camera 25, the image of the operator's eyes moves from the center to a lower portion of the sub image sensor 31 as the camera operator changes the watching position to the LCD 23 form the front of the LCD 23 to a position where the camera operator looks down the LCD 23 from above. And when the camera operator watches the LCD 23 from the left as if they look inside, the eye image moves from the center to the right in the sub image sensor 31 viewed from the camera operator. The window displacement decider 49 decides to displace the second window W2 in the same direction as the image of the eyes moves in the sub image sensor 31, that is, in the opposite direction to the direction of relative movement of the operator's watching position to the LCD 23.

Figure 8A:
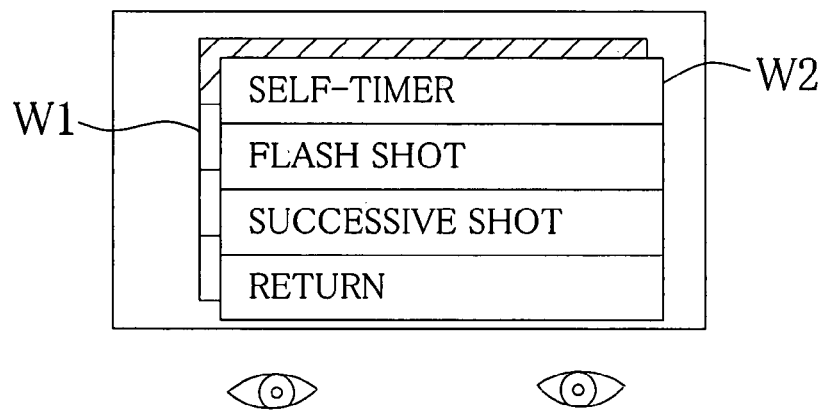
FIGS. 8A, 8B and 8C are explanatory diagrams illustrating how a window moves in response to the change in watcher's eye position.
Figure 8B:
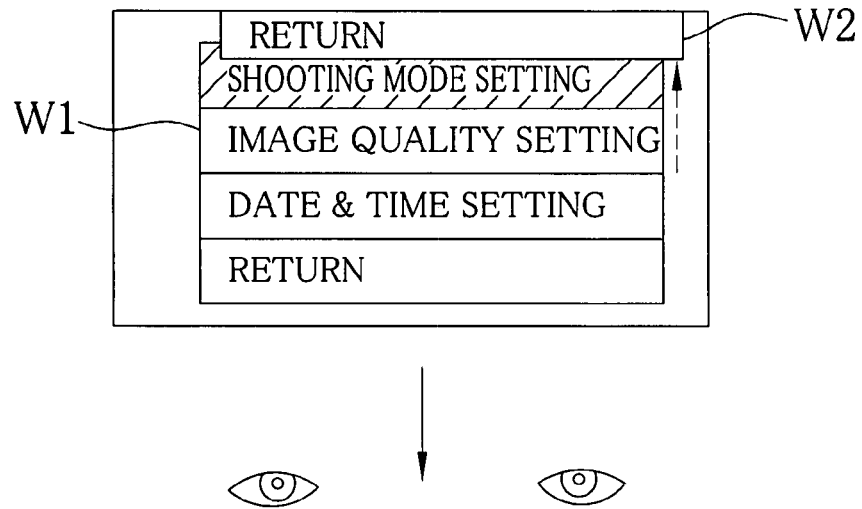
Figure 8C:
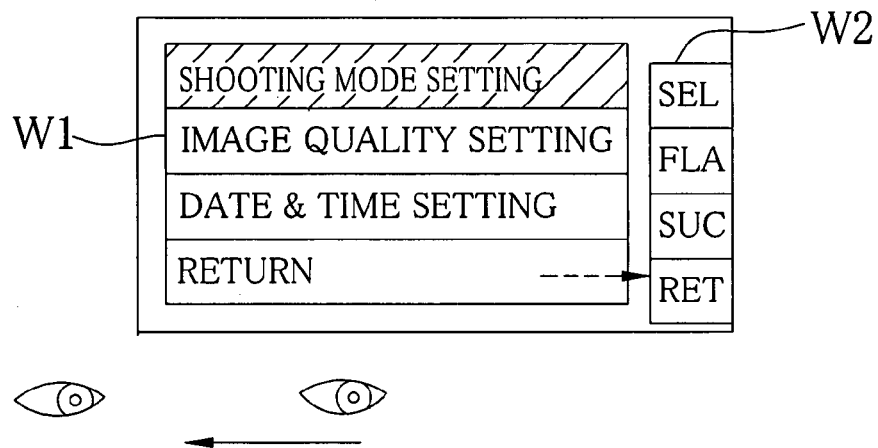

As shown in FIG. 8A, when the camera operator watches the LCD 23 from the front, the second window W2 is displayed in an initial position where the second window W2 is in front of the first window W1. As shown in FIG. 8B, when the camera operator moves their face downward or when the camera operator lifts the digital camera 10 upward, the eye position moves downward relative to the LCD 23, and the second window W2 moves upward from the initial position. The first window W1 hidden by the second window W2 is exposed on the screen. As shown in FIG. 8C, when the camera operator moves their face to the left or when the camera operator moves the digital camera 10 in the right-hand direction, the second window W2 is displaced in the right-hand direction on the screen and the first window W1 hidden by the second window W2 is uncovered.

The CPU 44 drives the second window W2 to move a given distance on the screen of the LCD 23 based on the displacing direction of the second window W2 decided by the window displacement decider 49. Even after the second window W2, the eye position change detector 48 analyzes the image data from the sub image sensor 31, to detect the eye position constantly. When the camera operator returns to the position where they watches the screen of the LCD 23 from the center front, the second window W2 also returns to the initial position where the second window W2 is in front of the first window W1. When the camera operator watches the LCD 23 at an angle and changes the direction, the second window W2 moves in a different direction accordingly as the magnification of change in eye position exceeds the reference values. The movement is the same for the third window W3. When the third window W3 is in front of the second window W2, the third window W3 moves according to the change in eye position.

When the setting menu is closed, the sub image sensor 31 is deactivated. With this, the detection of eyes and the like is also terminated. The CPU 44 executes a sequence according to the selected item in the setting menu. The camera operator can then shoot using the digital camera 10 after changing the setting.

In the digital camera 10 according to the above described embodiment, the direction in which the second window W2 is displaced is decided according to the direction of movement of the eye position of the camera operator, and the distance of displacement of the second window W2 is fixed to be a given value. However the present invention is not limited to this. It is also possible to displace the second window W2 farther as the distance of movement of the eye position gets longer. In this case, it can be set so that the closer the watcher is to the screen, the larger the rate of the window displacement to the eye position displacement. In the above described embodiment, the main window does not mean only a window that is displayed initially but any window with such selection items that act as the impetus for bringing the sub window to the appearance when a choice is made among these items. Therefore, the second window W2 can be called as the main window to the third window W3. When the screen is large enough to the size of the windows, it is possible to allow both the sub and the main windows to move in opposite directions to each other. When more than two windows overlap, it is possible to allow all the windows to move so as to stagger the windows evenly.

Figure 9:
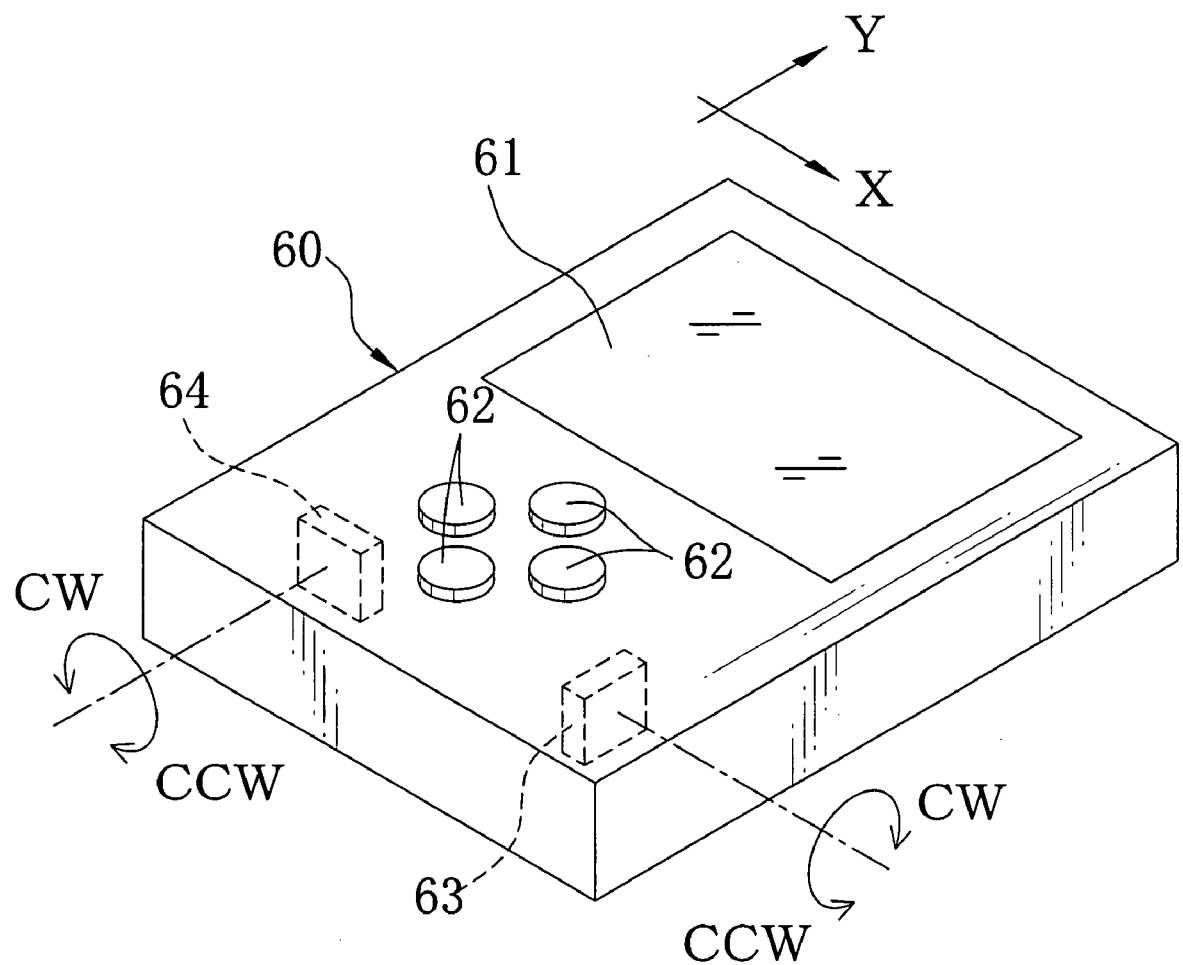
FIG. 9 is a perspective view of a mobile multi-player according to a second embodiment of the present invention.

Next, a second embodiment of the present invention will be explained. A mobile multi-player 60 shown in FIG. 9 is provided with a recording device, which stores image data and sound data, and can play a video product with sound or a music note. The user can watch the video on a LCD 61 and listen to the sound through an earphone. An operation button 62 is used for choice between playing video or music mode, screen setting mode for playing the video, and sound quality setting mode for playing the music. On the LCD 61, a setting menu for executing various settings is displayed. In the setting menu, a number of windows are displayed for every rank of the selection items, including a main window where superior selection items line up, and a sub window which is displayed when a choice is made among the superior selection items.

The mobile multi-player 60 is provided with gyro magnetic sensors 63 and 64 that detect angular velocity of turned directions whose respective centers are parallel axes with a screen of the LCD 61. The gyro magnetic sensor 63 detects the angular velocity about an X-axis which is parallel to a lateral or horizontal direction of the screen of the LCD 61. The gyro magnetic sensor 64 detects the angular velocity about a Y-axis which is parallel to a longitudinal or vertical direction of the screen. The gyro magnetic sensors 63 and 64 detect inclination or tilting movement of the screen of the LCD 61.

Figure 10:
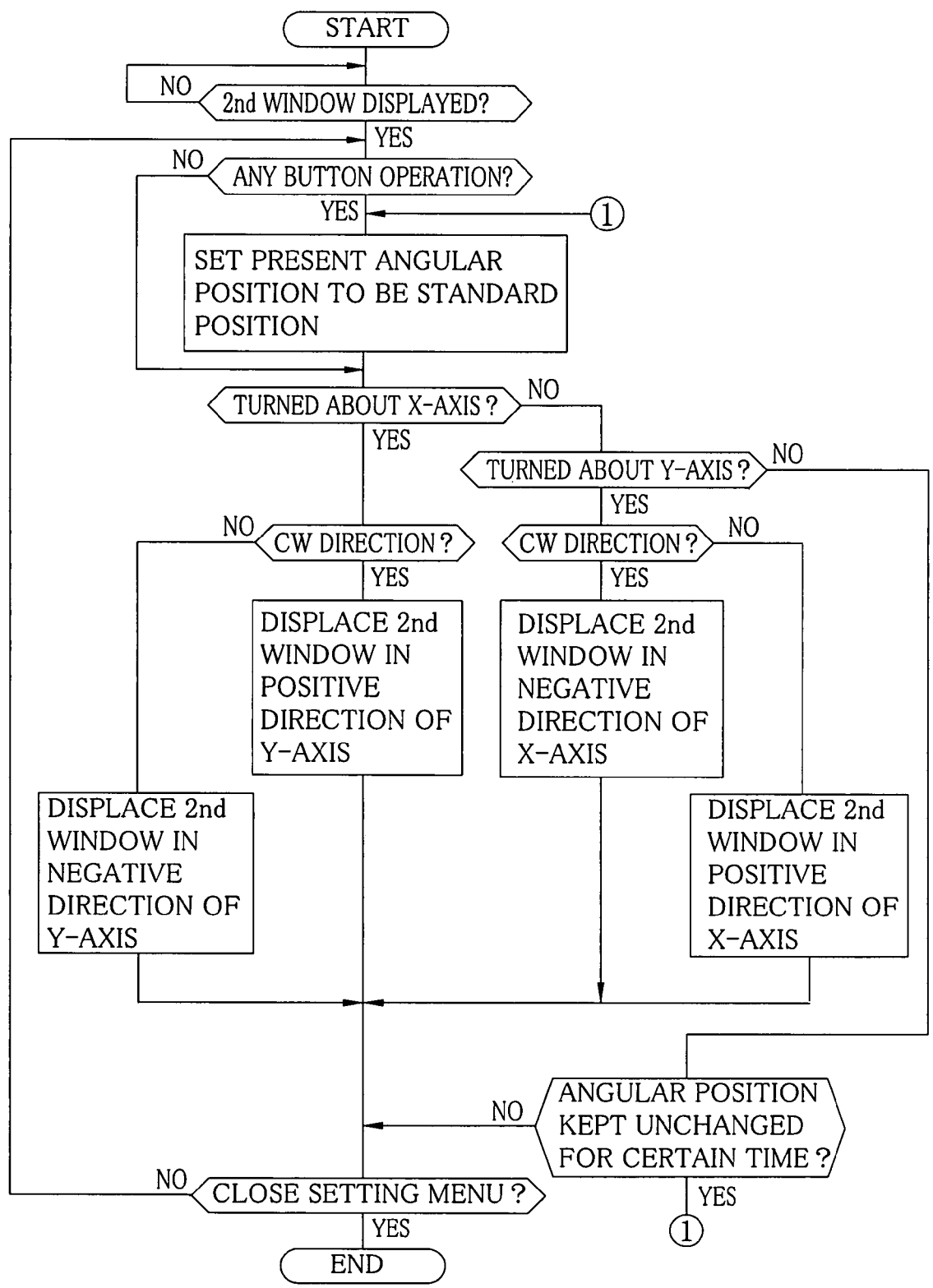
FIG. 10 is a flow chart illustrating a sequence of processes for displaying a setting menu.
Figure 11A:
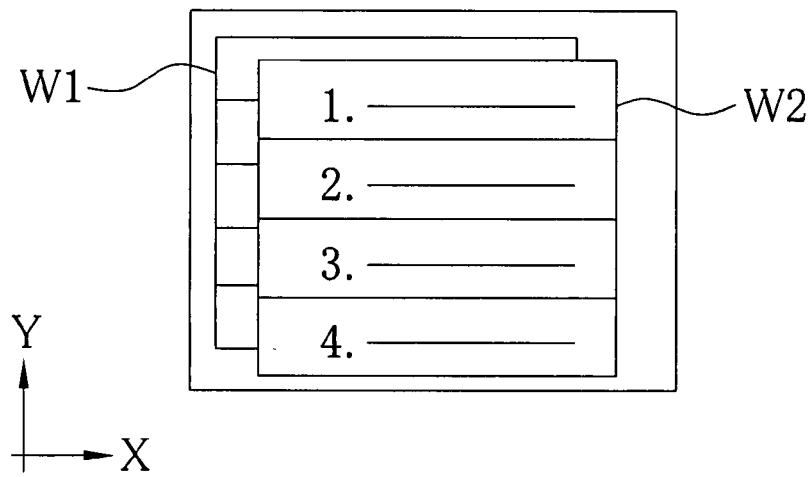
FIGS. 11A, 11B and 11C are explanatory diagrams illustrating how a window moves in response to a change in angular position of a display screen.

As shown in FIGS. 10 and 11, in the mobile multi-player 60, a first window W1 as a setting menu is displayed. When a certain selection item is selected from the first window W1, a second window W2 is displayed. When the second window W2 is displayed, the gyro magnetic sensors 63 and 64 are activated. When the operation button 62 is operated after the gyro magnetic sensors 63 and 64 are activated, an angular position of the mobile multi-player 60 at the time when the operation button 62 is operated is set to be a standard position. In the standard position of the mobile multi-player 60, the second window W2 is displayed in front of the first window W1 on the screen of the LCD 61 as shown in FIG. 11A.

When the mobile multi-player 60 is tilted, the gyro magnetic sensors 63 and 64 detect the direction of tilt. Specifically, the gyro magnetic sensor 63 detects the turn of the mobile multi-player about an X-axis in the drawing, and discriminates between clockwise turn (turn in CW direction) and counterclockwise turn (turn in CCW direction) when viewing the X-axis from a positive direction (a direction of an arrow X in FIG. 9). The gyro magnetic sensor 64 detects the turn about a Y-axis in the drawing, and discriminates between clockwise turn (turn in CW direction) and counterclockwise turn (turn in CCW direction) when viewing the Y-axis from the positive direction (the direction of an arrow Y in FIG. 9).

Figure 11B:
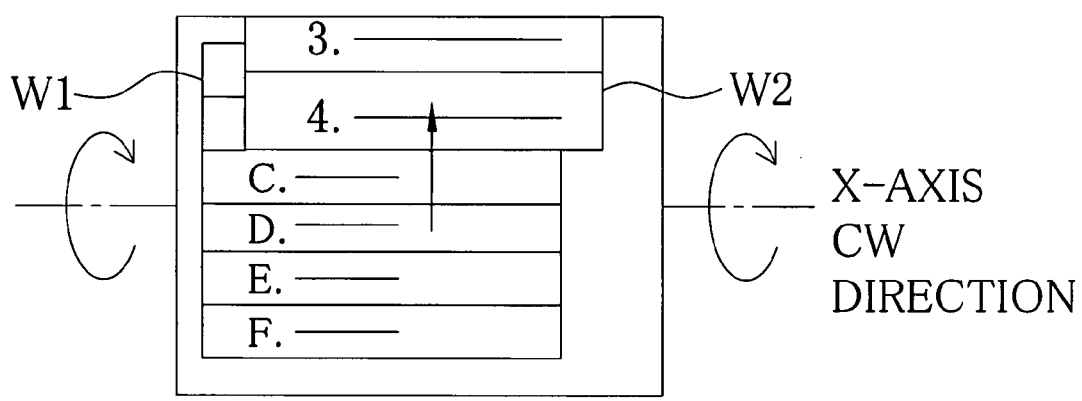

As shown in FIG. 11B, when the gyro magnetic sensor 63 detects the turn in the CW direction, the second window W2 displayed over the first window W1 moves a given distance in the positive direction of the Y-axis to expose the first window W1 hidden by the second window W2 on the LCD 61. When the gyro magnetic sensor 63 detects the turn in the CCW direction, the second window W2 moves a given distance in the negative direction of the Y-axis.

Figure 11C:
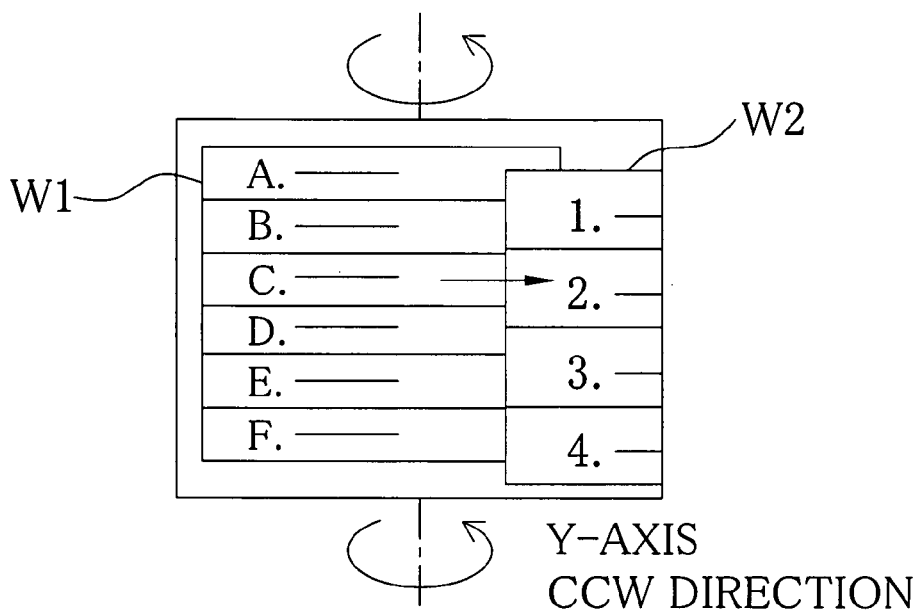

As shown in FIG. 11C, when the gyro magnetic sensor 64 detects the turn in the CCW direction, the second window W2 is displaced from the front of the first window W1 a given distance in the positive direction of the X-axis, to uncover the first window W1 hidden by the second window W2 on the LCD 61. On the other hand, when the gyro magnetic sensor 64 detects the turn in the CW direction, the second window W2 moves a given distance in the negative direction of the X-axis.

When the screen is kept tilted for a certain time after the second window W2 is displaced, the tilted state is reset to be the standard position and the second window W2 returns to an initial position shown in FIG. 11A. In this way, when the LCD 61 of the mobile multi-player 60 is tilted, the second window W2 moves toward a far end of the screen from a watcher of the screen, uncovering the first window W1 in the center of the screen. Moving the second window W2 upward enables selection items located on the downside of the first window W1 to be seen easily. Moving the second window W2 in the right-hand direction enables selection items located on the left of the first window W1 to be seen easily.

According to the above described embodiment, the mobile multi-player 60 uses the gyro magnetic sensors 63 and 64 in order to detect the tilt of the screen. The detection of the tilt of the screen is not limited to the detection of the angular velocity which occurs when tilting the screen. It is also possible to use a gravity sensor which detects an inclination to the direction of gravity.

Figure 12:
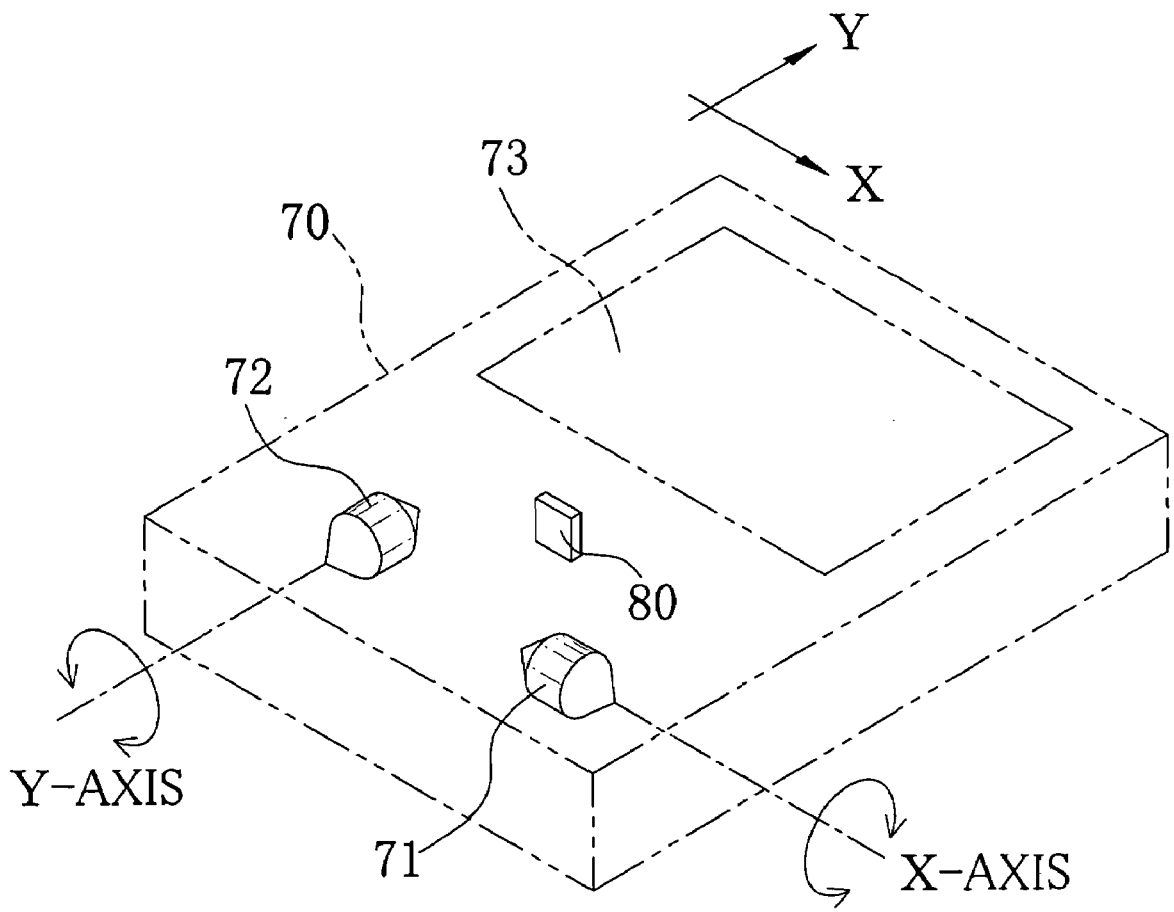
FIG. 12 is a perspective view of a mobile multi-player according to a third embodiment of the present invention.

In FIG. 12, a mobile multi-player 70 is provided with the gravity sensors 71 and 72 with conical ends on both sides. The gravity sensor 71 detects the tilt about an X-axis which is parallel with a lateral direction that is horizontal direction of the screen of an LCD 73. The gravity sensor 72 detects the tilt about a Y-axis which is parallel with a longitudinal direction that is vertical direction of the screen. The gravity sensors 71 and 72 have the same constitution but are arranged in different directions.

Figure 13A:
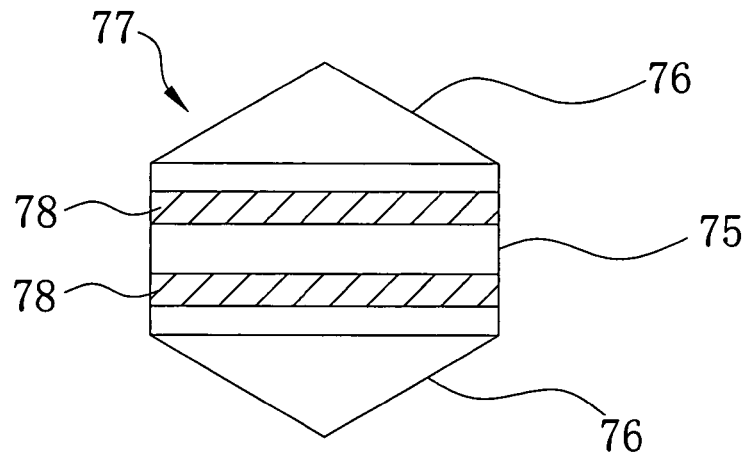
FIGS. 13A and 13B are explanatory diagrams illustrating a structure of a gravity sensor.
Figure 13B:
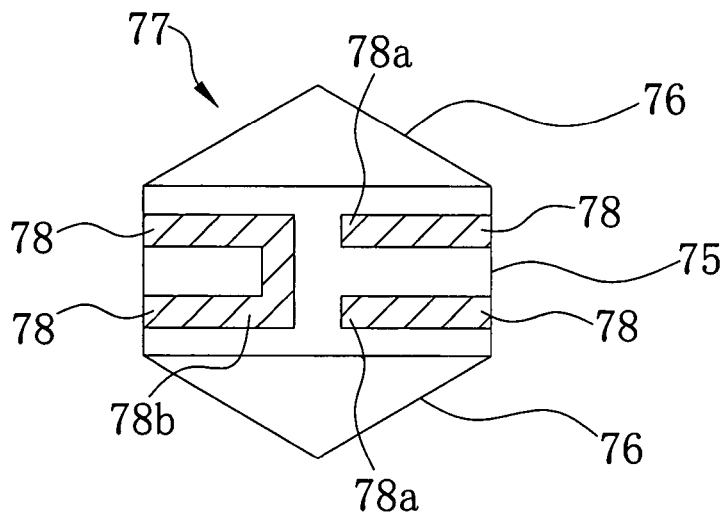
Figure 13C:
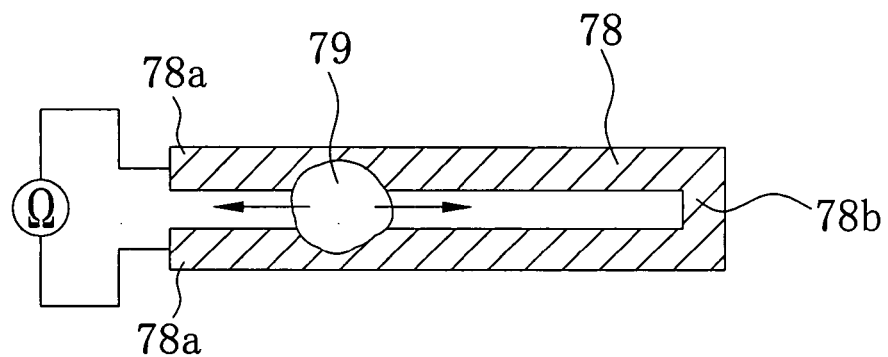

As shown in FIGS. 13A and 13B, the gravity sensors 71 and 72 are provided with a sensor body 77 that joins a cylindrical portion 75 in the center and a pair of conical portions 76 projecting from open ends of the cylindrical portion 75. In a circumference of the cylindrical portion 75, a resistance pattern 78 which consists of two strips stretching parallel with a circumferential direction is arranged. The two strips have one connected end 78b. As shown in FIG. 14C, where the cylindrical portion 75 is developed in a plane view, a voltage is applied across a pair of ends 78a of the strips, to measure the electrical resistance. The sensor body 77 is hollow and filled with liquid. The sensor body 77 is provided with a mercurial conductive member 79 which short-circuits the resistance pattern 78.

Because of its high specific gravity, when the sensor body 77 is tilted in a rotational direction about the X-axis, the conductive member 79 moves along the resistance pattern 78 on the inner periphery of the cylindrical portion 75, changing a position where the resistance pattern 78 is short-circuited. Because the move of the conductive member 79 changes the electrical resistance value, the electrical resistance value represents the position of the conductive member 79 and thus the inclination angle of the sensor body 77. When the sensor body 77 is tilted so that apexes of the conical portions 76 align in the gravity direction, the conductive member 79 leaves the resistance pattern 78 and gets into the conical portion 76. In this state, the electrical resistance value is kept to be a constant value because the voltage is applied to the whole length of the resistance pattern 78. That is to say, when the mobile multi-player 70 is tilted or turned about the X-axis, the electrical resistance value measured by the gravity sensor 72 is maintained constant. When the mobile multi-player 70 is tilted or turned about the Y-axis, the electrical resistance value measured by the gravity sensor 71 is maintained constant.

The mobile multi-player 70 is used on the promise that a state where the screen of the LCD 73 is oriented perpendicularly to the gravity direction is regarded as its standard position. The gravity sensors 71 and 72 can detect the tilt angle when being tilted from the standard position in the turning direction about the X-axis or the Y-axis, respectively. On the other hand, in a state where the screen is oriented parallel to the gravity direction, it is impossible to detect the tilt in a direction turning about the gravity direction. Therefore, a geomagnetic sensor 80 is provided to detect from a geomagnetic direction which direction the screen is oriented, while an upper end of the screen of the LCD 73 oriented upward and the screen is oriented parallel to the gravity direction. When a tilt to the gravity direction or the geomagnetic direction is detected, a moving direction of a second window W2 on a setting menu is decided in the same way as described with respect to the mobile multi-player 60.

Figure 14:
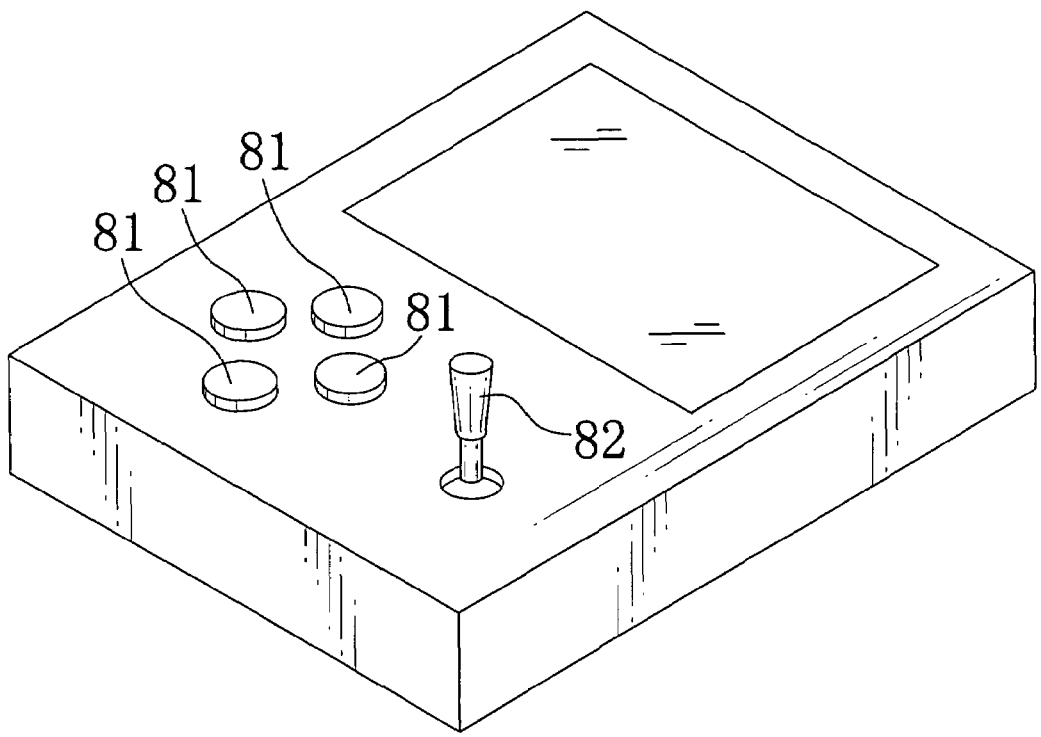
FIG. 14 is an explanatory diagram illustrating a relationship between a conductive member and a resister pattern, as essential components of the gravity sensor.
Figure 15:
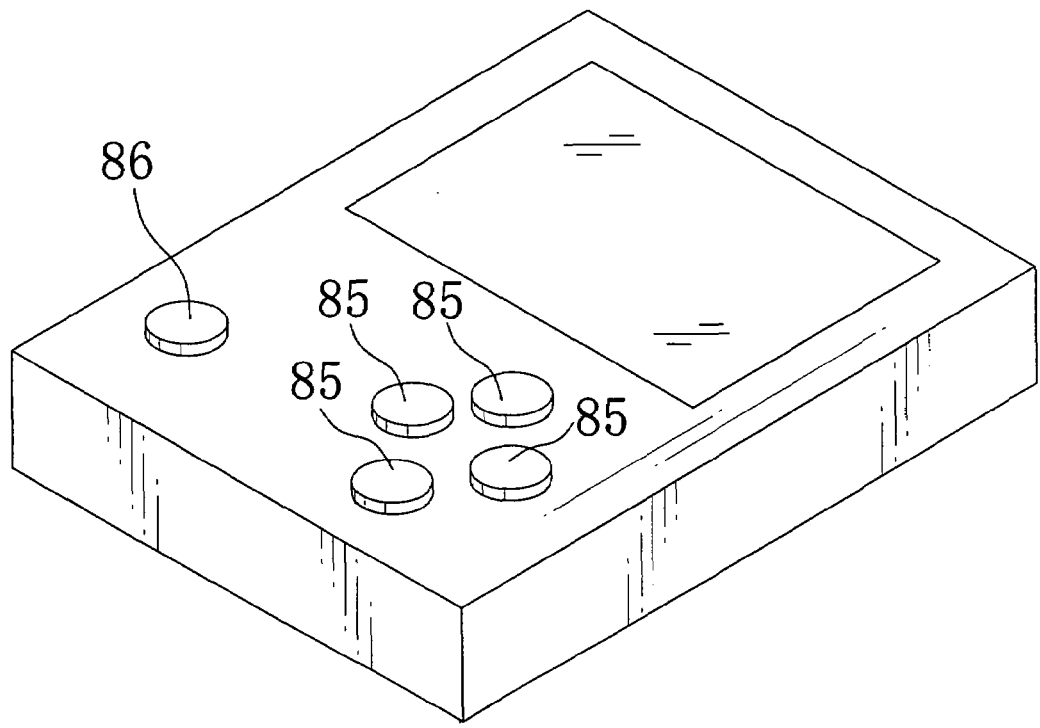
FIG. 15 is a perspective view of a mobile multi-player according to a third embodiment of the present invention.

In the above described embodiments, the second window W2 is displaced based on a change in position of the watcher relative to the screen or the inclination of the screen. However, it is possible to displace the second window W2 when it is detected that the screen is slid parallel to the screen. Instead of detecting the watcher's position or the screen displacement, it is also possible to provide a mobile multi-player with direction keys 81 for designating a selection item and a stick key 82 for deciding a displacing direction of the second window W2, as shown in FIG. 14. With the stick key 82, it is possible to decide not only the direction but also the amount of movement of the second window W2 by an angle through which the key 82 is operated or by a length of time the key 82 is operated for. As shown in FIG. 15, it is also possible to provide a mobile multi-player with general-purpose direction keys 85 which function both as direction keys for designating a direction of a cursor toward a selection item and as direction keys for displacing the second window W2. In that case, a switching button 86 for switching between the functions of the general-purpose direction keys 85 is provided to decide whether the keys are used for selection among the selection items or for displacing the second window W2. Moreover, where the second window W2 is moved by key operations, it is possible to send a radio signal from an operation device, which is provided with operation keys and the like, to a display device, for remote control of the screen.

The present invention is applicable not only to digital cameras and video and music players, but also to various electronic equipments provided with a display device, including a mobile phone, a portable game machine and a pinball machine.

Thus, the present invention is not to be limited to the above embodiments but, on the contrary, various modifications will be possible without departing from the scope of claims appended hereto.

What is claimed is:

1. A window display system for displaying at least a main window and a sub window on a display screen, wherein said main window offers a choice of several items, and said sub window is displayed in front of said main window when the choice is made in said main window, to show information on the chosen item, said window display system comprising:
    an imaging device for capturing an image of a watcher who is watching said display screen;
    a position detecting device for detecting a watching position of the watcher to said display screen by analyzing the image of the watcher;
    a position change detecting device for detecting a direction and a distance of a parallel movement of said watching position relative to said display screen; and
    a window displacing device for displacing said sub window from the front of said main window based on the movement of said watching position as detected by said position change detection device, wherein
    said window displacing device moves said sub window in an opposite direction to the direction of the movement of said watching position detected by said position change detection device.

2. A window display system for displaying at least a main window and a sub window on a display screen, wherein said main window offers a choice of several items, and said sub window is displayed in front of said main window when the choice is made in said main window, to show information on the chosen item, said window display system comprising:
    an imaging device for capturing an image of a watcher who is watching said display screen;
    a position detecting device for detecting a watching position of the watcher to said display screen by analyzing the image of the watcher;
    a position change detecting device for detecting a direction and a distance of a parallel movement of said watching position relative to said display screen; and
    a window displacing device for displacing said sub window from the front of said main window based on the movement of said watching position as detected by said position change detection device, wherein
    said position detecting device detects eyes of the watcher from the image, to determine an eye position of the detected eyes within an image frame to be corresponding to said watching position and the window display system further comprises,
    a distance detecting device for detecting a distance of the watcher from said display screen based on the size of the eyes in the image, the distance between the eyes in the image, or both, wherein if eyes of more than one person are detected from the image, said position detecting device determines said watching position by the eyes of the nearest person to said display screen.

3. A window display system for displaying at least a main window and a sub window on a display screen, wherein said main window offers a choice of several items, and said sub window is displayed in front of said main window when the choice is made in said main window, to show information on the chosen item, said window display system comprising:
    an imaging device for capturing an image of a watcher who is watching said display screen;

a position detecting device for detecting a watching position of the watcher to said display screen by analyzing the image of the watcher;

a position change detecting device for detecting a direction and a distance of a parallel movement of said watching position relative to said display screen; and a window displacing device for displacing said sub window from the front of said main window based on the movement of said watching position as detected by said position change detection device, wherein said position detecting device detects eyes of the watcher from the image, to determine an eye position of the detected eyes within an image frame to be corresponding to said watching position, and said movement detecting device detects a change in distance of said eye position from a center of the image frame.

4. A window display system for displaying at least a main window and a sub window on a display screen, wherein said main window offers a choice of several items, and said sub window is displayed in front of said main window when the choice is made in said main window, to show information on the chosen item, said window display system comprising:

an imaging device for capturing an image of a watcher who is watching said display screen;

a position detecting device for detecting a watching position of the watcher to said display screen by analyzing the image of the watcher;

a position change detecting device for detecting a direction and a distance of a parallel movement of said watching position relative to said display screen;

a window displacing device for displacing said sub window from the front of said main window based on the movement of said watching position as detected by said position change detection device; and a distance detecting device for detecting a distance of the watcher from said display screen, and a judging device for judging whether the parallel movement of said watching position reaches a reference value that is decided by the distance of the watcher from the display screen, wherein said window displacing device displaces said sub window when it is judged that the parallel movement of said watching position reaches the reference value.

5. A window display method for displaying at least a main window and a sub window on a display screen, wherein said main window offers a choice of several items, and said sub window is displayed in front of said main window when the choice is made in said main window, to show information on the chosen item, said window display method comprising the steps of:

capturing an image of a watcher who is watching said display screen;

detecting a watching position of the watcher to said display screen by analyzing the image of the watcher;

detecting a direction and a distance of a parallel movement of said watching position relative to said display screen; and displacing said sub window from the front of said main window based on the movement of said watching position as detected, wherein said window displacing step moves said sub window in an opposite direction to the direction of the movement of said watching position.

6. A window display method for displaying at least a main window and a sub window on a display screen, wherein said main window offers a choice of several items, and said sub window is displayed in front of said main window when the choice is made in said main window, to show information on the chosen item, said window display method comprising the steps of:

capturing an image of a watcher who is watching said display screen;

detecting a watching position of the watcher to said display screen by analyzing the image of the watcher;

detecting a direction and a distance of a parallel movement of said watching position relative to said display screen; and displacing said sub window from the front of said main window based on the movement of said watching position as detected, wherein said position detecting step comprises the steps of:

detecting eyes of said watcher from said image; and determining an eye position of the detected eyes within an image frame to be corresponding to said watching position, said window display method further comprising the steps of:

detecting a distance of the watcher from said display screen based on the size of the eyes in the image, the distance between the eyes in the image, or both, determining said watching position by the eyes of the nearest person to said display screen if eyes of more than one person are detected from the image.

* * * * *